(12) United States Patent
Tuma

(10) Patent No.: US 10,328,617 B2
(45) Date of Patent: Jun. 25, 2019

(54) METHOD FOR PRODUCING A PLASTICS PRODUCT AND DEVICE FOR CARRYING OUT THE METHOD AND ALSO CLOSURE PRODUCT OR ADHESION PRODUCT PRODUCED BY THE METHOD AND THE DEVICE

(71) Applicant: Gottlieb Binder GmbH & Co. KG, Holzgerlingen (DE)

(72) Inventor: Jan Tuma, Herrenberg (DE)

(73) Assignee: GOTTLIED BINDER GMBH & CO. KG, Holzgerlingen (DE)

( * ) Notice: Subject to any disclaimer, the term of this patent is extended or adjusted under 35 U.S.C. 154(b) by 1342 days.

(21) Appl. No.: 13/261,909

(22) PCT Filed: Nov. 21, 2012

(86) PCT No.: PCT/EP2012/004823
§ 371 (c)(1),
(2) Date: May 29, 2014

(87) PCT Pub. No.: WO2013/104383
PCT Pub. Date: Jul. 18, 2013

(65) Prior Publication Data
US 2015/0010732 A1    Jan. 8, 2015

(30) Foreign Application Priority Data

Jan. 12, 2012 (DE) .......................... 10 2012 000 374

(51) Int. Cl.
*B29C 43/22* (2006.01)
*A44B 18/00* (2006.01)
(Continued)

(52) U.S. Cl.
CPC ........ *B29C 43/222* (2013.01); *A44B 18/0049* (2013.01); *A44B 18/0065* (2013.01);
(Continued)

(58) Field of Classification Search
CPC .................................................. B29C 43/222
See application file for complete search history.

(56) References Cited

U.S. PATENT DOCUMENTS 6,258,311 B1    7/2001  Jens
2007/0063375 A1*  3/2007  Tuma ................. A44B 18/0049
264/166

FOREIGN PATENT DOCUMENTS

DE    196 46 318 A1    5/1998
DE    198 28 856 C1    10/1999
(Continued)

*Primary Examiner* — Larry W Thrower
(74) *Attorney, Agent, or Firm* — Wenderoth, Lind & Ponack, L.L.P.

(57) ABSTRACT

A method for producing a plastic product including a support (30) having protruding stem parts (36) having at their free ends head parts (38) with a wider diameter compared with the stem parts (36). The stem parts and the head parts are formed in cavities (16) of a moulding screen (12) that are formed, on their sides facing away from the support (30) in a shaping zone of the moulding screen (12). The shaping zone is sealed off from the environment by a counter-face (20) such that a predefinable amount of air enclosed in the shaping zone exerts a counter-pressure on the plastic material introduced into the respective cavity (16) of the shaping zone to support the shaping process.

13 Claims, 5 Drawing Sheets

(51) Int. Cl.
*B29C 33/00* (2006.01)
*B29C 43/24* (2006.01)
*B29C 43/46* (2006.01)
B29L 31/00 (2006.01)
B29K 101/12 (2006.01)

(52) U.S. Cl.
CPC .......... *B29C 33/0027* (2013.01); *B29C 43/24* (2013.01); *B29C 43/46* (2013.01); *B29C 2043/465* (2013.01); *B29K 2101/12* (2013.01); *B29L 2031/729* (2013.01); *Y10T 428/24479* (2015.01)

(56) References Cited

FOREIGN PATENT DOCUMENTS

| | | |
|---|---|---|
| DE | 10 2004 012 067 A1 | 10/2005 |
| DE | 10 2009 050 586 A1 | 5/2011 |
| WO | WO 02/39842 A1 | 5/2002 |
| WO | WO 2005/087033 A1 | 9/2005 |

* cited by examiner

METHOD FOR PRODUCING A PLASTICS PRODUCT AND DEVICE FOR CARRYING OUT THE METHOD AND ALSO CLOSURE PRODUCT OR ADHESION PRODUCT PRODUCED BY THE METHOD AND THE DEVICE

FIELD OF THE INVENTION

The invention relates to a method for producing a plastic product including a support having protruding stem parts, which have at their free ends head parts with a wider diameter compared to the respective stem parts. The stem parts and the head parts are formed in cavities of a molding screen, which cavities are formed on the side thereof facing away from the support in a shaping zone of the molding screen. The invention further relates to a device for carrying out the method, as well as a closure or adhesion product, which is produced according to this method or using this device.

BACKGROUND OF THE INVENTION

A method for the production of a closure product is known from DE 196 46 318 A1, which method has a plurality of hooks integrally formed on a support. The hooks are in the form of stem parts having thickened sections. The stem parts are formed by a thermoplastic being introduced, in plastic or fluid form, into the gap between a compression roller and a molding roller. The molding roller is provided with hollow spaces that are open to the inside and the outside. Both rollers are driven in opposite directions of rotation, so that the support is formed in the gap between the rollers. The known method, which is also generically assigned to the chili-roll method, is characterized in that the molding roller has a screen. The cavities of the screen are produced by etching or by a laser. Finished mushroom-shaped hooks arise simply in that the thermoplastic in the open hollow spaces of the screen of the molding roller is at least partially hardened. In the prior art, a low-cost manufacturing process for producing closure parts made of thermoplastic is created in addition to the associated production device. Such mushroom-shaped hooks can be loosely meshed with looped parts and/or otherwise corresponding hooks of an additional closure part in order to form a closure that can be repeatedly opened and closed. Such closure systems are also known throughout the world under the brand name Kletten® or Kletten® hook and loop fasteners, at least in the professional world.

A method for producing adhesion elements on a support by using at least one plastic material is now known from DE 10 2004 012 067 A 1, which material is introduced into at least one molding element. Adhesive elements are created by the known method having ends on the stems that widen as head parts, the adhesion of which is primarily obtained by van der Waals forces. In the case of the known method, the respective plastic material used is preferably thixotropic and has a viscosity, measured using a rotation viscometer, of 7,000 to 15,000 mPas. In addition, a drum or band-shaped screen is then used as a respective molding element. In this case, this element is provided with at least 10,000, preferably with 16,000 or more molding cavities per $cm^2$.

Van der Waals forces are intermolecular forces, which occur as weak binding forces between inert atoms and saturated molecules. While only the dispersion forces come into play in the interaction between atoms, the interactions of induced or potentially permanently existing dipole moments (orientation effect) in molecules act as additional forces of attraction. Although some authors treat the term "van der Waals forces" as a synonymous with intermolecular forces, the majority understand "van der Waals forces" to also refer to those very far-reaching forces of attraction between neutral molecules.

Using the known method, as well as device and product solution, adhesion systems may be implemented, in which the adhesion product can be fixed to any surfaces. In addition to fastening options of this sort, new applications in medical technology have also been developed in the recent past, for example for wound and burn care.

In the case of these known solutions, the molding of the plastic material in the molding cavities of the molding screen is done slowly, in order to obtain a configuration of the regular, mushroom-shaped closure head as a respective head part. The shape of the head part is as stable as possible, with the proviso that after adequate curing time, this closure head can be well formed by the screen in order to make the closure product or the adhesion product.

SUMMARY OF THE INVENTION

An object of the present invention is to provide an improved method and device, which not only allows the uniform molding of the head and stem parts by the molding screen, but also allows significantly faster molding, so that significantly faster production speeds are thereby made possible, which in turn, helps to lower production costs. A further object of the invention is to obtain an advantageous embodiment of the closure or adhesion product by the method according to the invention and device.

Such object is basically achieved with a method according to the invention, where the shaping zone is sealed off from the environment by a counter-face in such a way that a predeterminable quantity of air enclosed in the shaping zone exerts a counter-pressure on the plastic material introduced into the respective cavity of the shaping zone in order to support the shaping process. The penetration of the plastic melt into the respective molding cavity is made more difficult by the enclosed quantity of air so that, in addition to a compression of the melt, there is also an improved orientation of the plastic material within the shaping zone. The result is that, in particular, the head parts that are to be formed are oriented along the molding walls of the respective cavity within the shaping zone and also harden more rapidly. The demolding process can then proceed more quickly, which helps to reduce the production costs for the closure or adhesion product being produced.

As a result of the quantity of air enclosed in the respective cavity between the counter-face and the shaping zone, into which plastic melt has been introduced, additional molding pressure is applied to the upper side of the respective head part by the air thus enclosed. An increased contact pressure then arises between the peripheral edges of the head part and the adjacently disposed circumferential molding wall of the cavity. As a result of this increased contact pressure, in addition to the directional orientation for the respective closure or adhesive head part, which leads to improved strength properties, the curing process is accelerated, which determines faster molding times.

In addition, the above mentioned object is also achieved by a device for carrying out the aforementioned method. The above mentioned shaping zone of the molding screen is sealed off from the environment by the counter-face in such a way that a predeterminable quantity of air enclosed in the shaping zone exerts a counter-pressure on the plastic material introduced into the respective cavity of the shaping zone in order to support the shaping process.

The closure or adhesion product that is then obtained, which likewise achieves the object according to the invention, is specifically characterized in that the height of the product between the underside of the support and the upper side of the support is minimized in such a way, preferably equaling 40 to 120 μm, particularly preferably 70 to 110 μm. The product has elastic properties at least in partial regions, in particular in the longitudinal direction of the support. As a whole, when compared to the prior art, closure or adhesion products are obtained by the method according to the invention and device, which in addition to increased peel strength values, including in terms of material strength, can be made significantly thinner, which results in softer and more flexible closure or adhesion products. Such products, which make a softer and more flexible impression, can then be easily processed within hygiene products such as baby diapers and the like, where the product being tolerated by and working well with the skin is essential.

In the following, the method according to the invention is explained in greater detail based on two devices for carrying out the method in addition to the closure or adhesion product thus obtained.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are not schematic and not to scale.

DETAILED DESCRIPTION OF THE INVENTION

Figure 1:
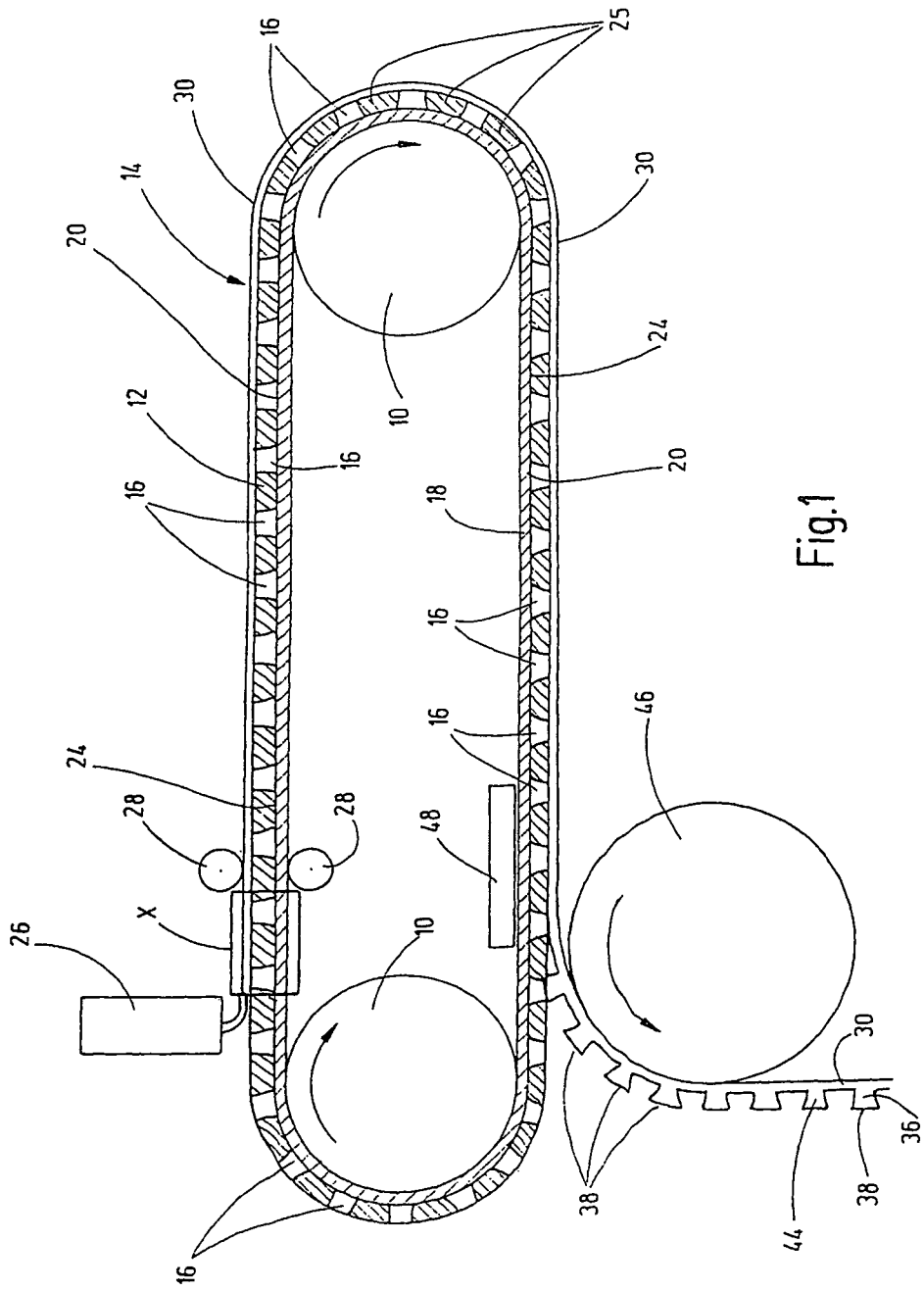
FIG. 1 is a side view in section of a manufacturing device according to a first embodiment of the invention.

The manufacturing device according to FIG. 1 shows the basic construction in a horizontal manufacturing orientation. A band-shaped molding screen 12, which is a component of a molding tool 14, extends between two roller-shaped guide elements 10. At least one guide element 10 can be driven. The molding screen 12 has a plurality of individual molding cavities 16, which extend entirely through the molding screen 12. Each cavity 16 has the form of a hyperboloid of revolution when viewed from the side according to the enlarged longitudinal section X of FIG. 1, reproduced in FIG. 2. Other cavity shapes are also possible, depending on the predeterminable shape of the final product that is to be produced.

Figure 3:
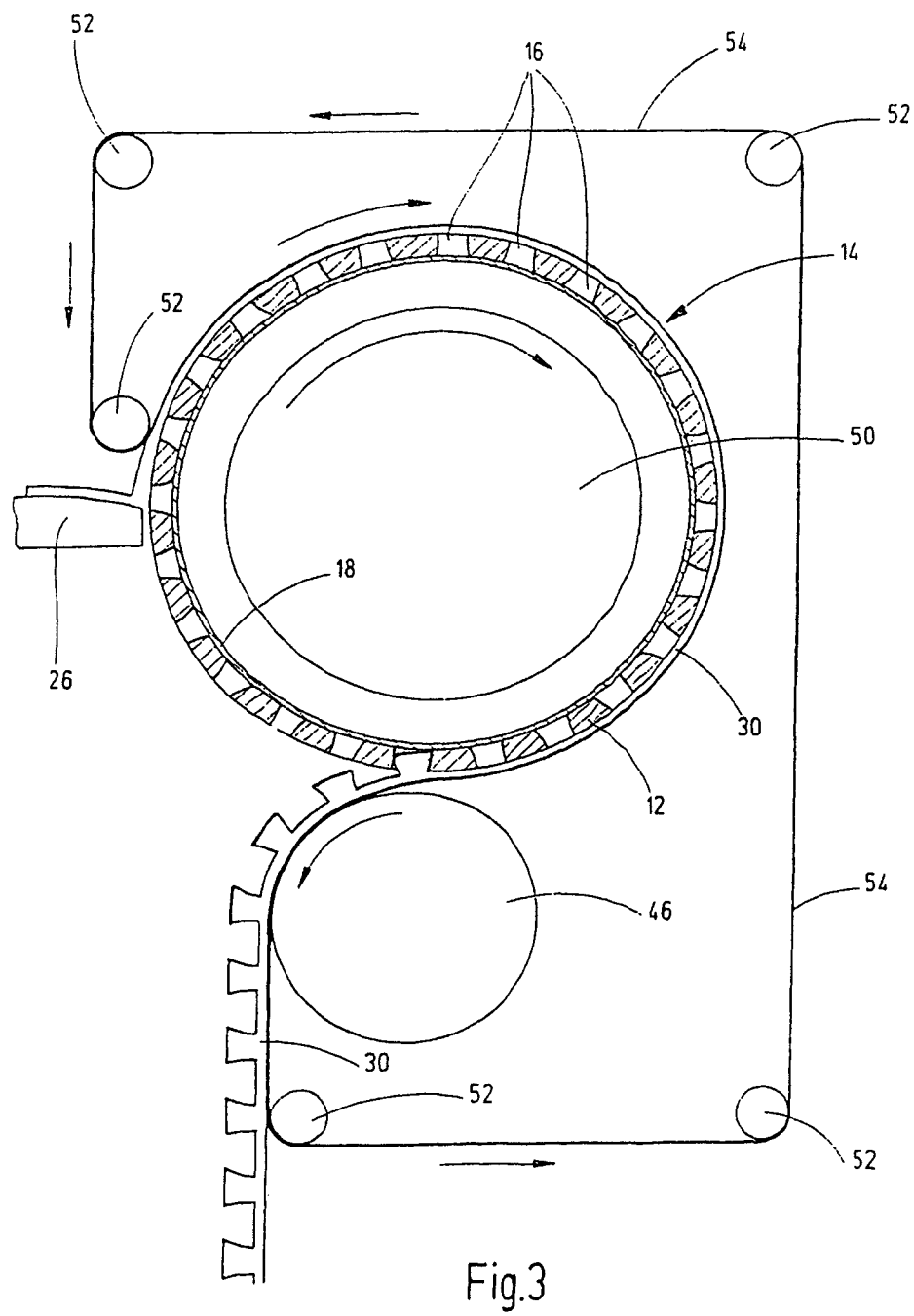
FIG. 3 is a side view in section of a manufacturing device according to a second exemplary embodiment of the invention.

Viewed in the direction shown in FIG. 1, an additional band 18 extends within the band-shaped molding screen 12. The additional band 18 forms closed surfaces and is not provided with cavities, at least in those regions in which the band 18 covers the cavities 16 of the band-shaped molding screen 12. The side 20 of the additional band 18 facing the molding screen 12 then forms a counter-face, which together with the boundary walls 22 (pg. FIG. 3) of the individual molding cavities 16, delimits the respective shaping zone of the molding screen 12.

The bands 12 and 18, which are divided in the manner of an upper run and lower run, have a predeterminable width (not shown) extending into the plane of the drawing. The cavities 16, only shown in a single plane in FIG. 1, likewise extend in the plane of the drawing over a predeterminable distance. The screening band 12 thus formed may have several hundred, thousand, or ten thousand or more through holes in each $cm^2$ band material surface. To ensure better understanding however, the pertinent proportions are not taken into account in the depiction in FIG. 1.

The drive direction of the guide elements 10 is shown by arrows in FIG. 1, so that in the selected drive direction, the two bands 12 and 18 move from left to right as viewed in FIG. 1 with reference to the upper run layer of both bands 12, 18. Both bands having the same axial movement speed. The two bands 12 and 18 are separate components, and are separated from one another with the exception of the common attachment with one another, so that the counter-face 20 of the additional band 18, together with the contact surface 24 of the molding screen 12 facing the additional band 18, encloses ambient air. Although the ambient air then enclosed can enter the individual cavities 16, the predeterminable quantity of air, which is located in the respective shaping zone, is subjected to a counter-pressure by a seal in the region of the screen parts 25 of the molding screen 12. The air enclosed in the cavity 16 then cannot readily be displaced outward into the environment during the shaping process.

Insofar as the manufacturing device according to FIG. 1 is operated within the context of a closed system (not shown), in principle the manufacturing device can be operated within a medium chamber, in which nitrogen may be introduced, for example, instead of ambient air. In principle, other working gases such as argon, helium, etc. may also be used here, so that a surface modification for the closure or adhesion product that is to be produced by the device may be performed with such noble gases, if necessary.

In addition, the device according to FIG. 1 has an application device 26, for example in the manner of a conventionally formed extruder nozzle, which, having separate nozzles (not shown) on the underside thereof, performs the extrusion application of an extrudable plastic material into the molding cavities 16. The penetration of the plastic material into the molding cavities 16 of the molding screen 12 may be supported by compression rollers 28, which are disposed on the opposite side of the bands 12, 18. Such arrangement is only shown as an example in order to illustrate the function of the compression rollers. In reality, both the application device 26 and the compression roller 28, which also performs a supporting and guiding function, have a substantially more complicated design that what is shown in this case.

Figure 2:
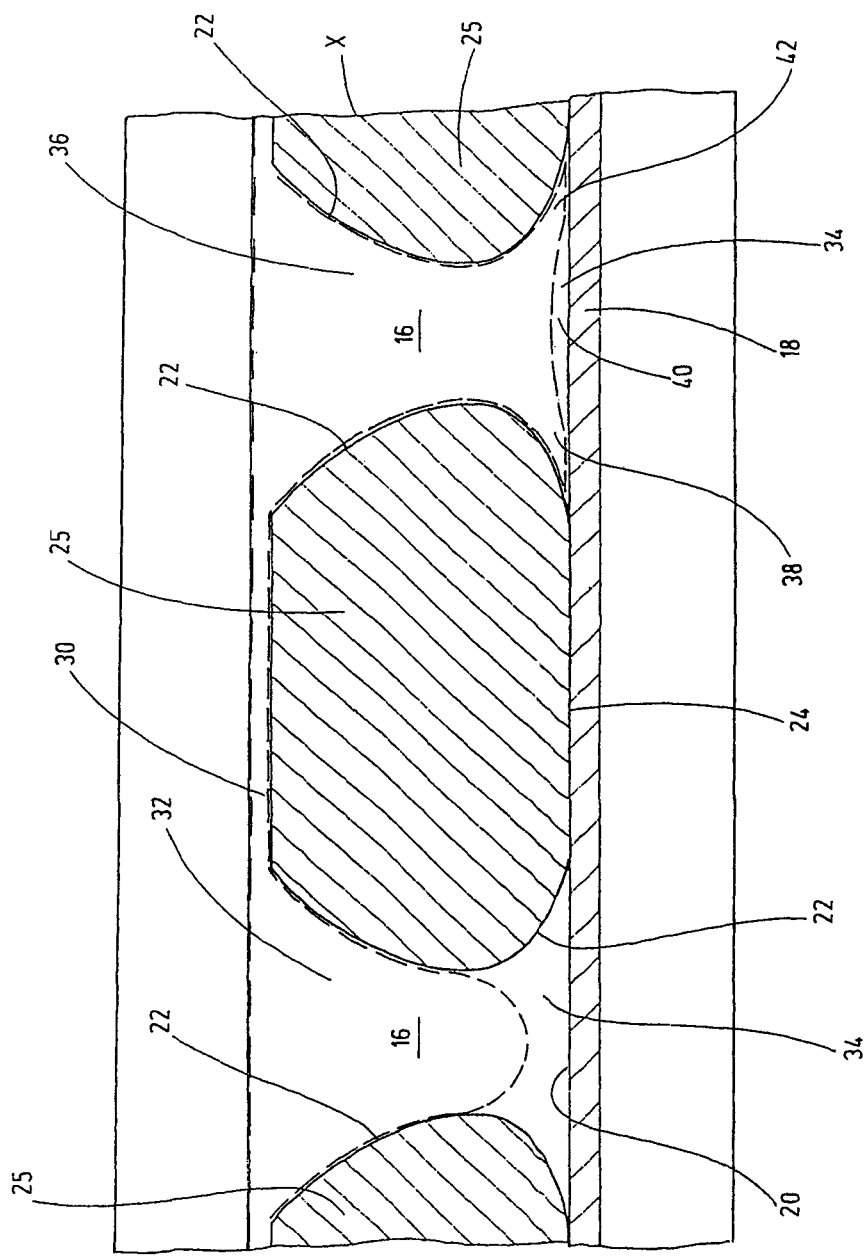
FIG. 2 is an enlarged side view in section of a detail indicated in FIG. 1 as X.

As shown in the enlarged section of the image detail X according to FIG. 2, the plastic material is extruded in the manner of a dome 32 (shown as a broken line) into the associated molding cavity 16 by the design of the band-shaped support 30. The remaining quantity of air 34 in the shaping zone is increasingly reduced, so that a counter-pressure is exerted on the front side of the dome 32. This counter-pressure therefore builds up because the enclosed quantity of air cannot be displaced into the environment 34 due to the seal established between the contact surface 24 of the screening band 12 and the facing side or counter-face 20 of the additional band 18. In addition to a stem part 36, further entry of the plastic material into the molding cavity 16 also creates a widened head part 38 (see also FIG. 4) at the end of said stem part. The quantity of air 34 that is not displaced can introduce a concave indentation 40 at the free front end of the head part 38 (shown as a dashed line in FIG. 3). The process of air displacement can also be controlled such that a flat upper side of the head without a concave indentation may also be created by completely displacing the quantity of air 34. The manufacturing process addressed proceeds continuously, in which plastic material is continuously filled into the initially empty cavities 16, which are moving to the right, by the extrusion device 26.

Figure 4:
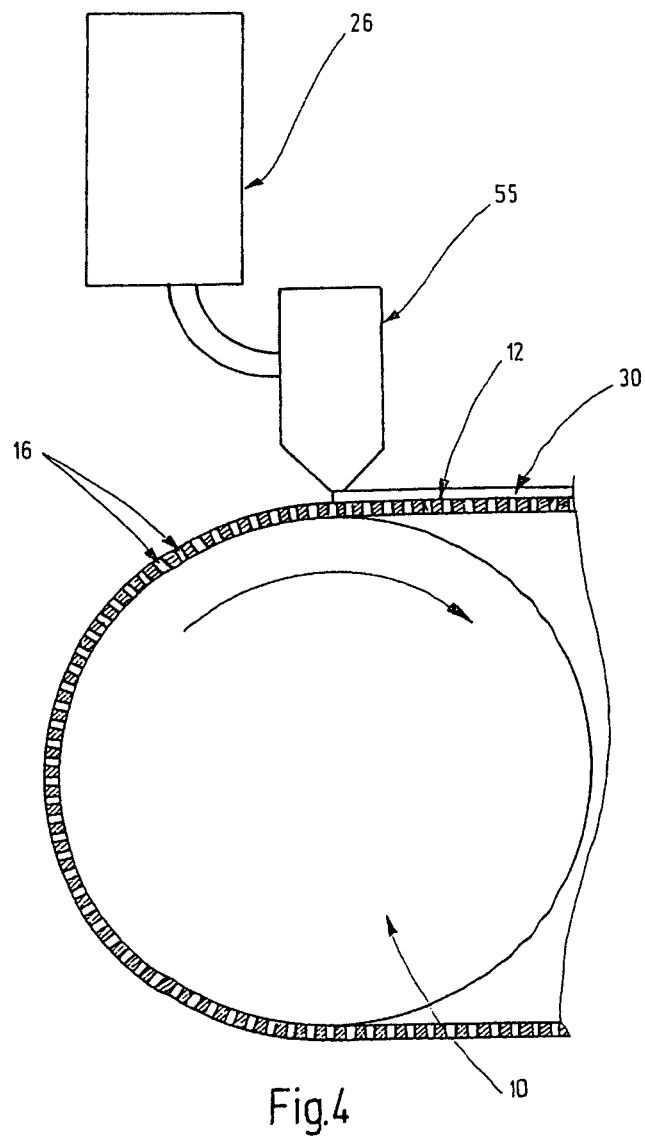
FIG. 4 is a side view in section of a manufacturing device according to a third exemplary embodiment of the invention.

As FIG. 2 additionally shows, when viewed in cross-section, the side flank end 42 of the head part 38 tapers laterally or radially outward to the surroundings, so that the edge 42 at the flank end of the head part 38 is formed such that it is correspondingly flexible and pliable. Nevertheless, it exhibits the rigidity needed for hooking or adhesion. Also contributing to this ability is the fact that the quantity of air displaced by the counter-pressure results in a reinforced orientation alignment in the region of the flank end 42 of the head part 38, in which the displaced air provides the plastic material in the region of the respective stem part 36 with a longitudinal orientation when viewed in the axial direction, and the respective head part 38 with a uniform transverse orientation when viewed in a longitudinal direction, by the direction of flow on all sides thereof. The macromolecular orientation of the plastic material as a result of the counter-pressure allows the closure or adhesion product 44, including the support side 30 thereof, to be formed thin enough that the end product 44 according to the depiction in FIG. 4 is not only softer and more flexible than previous comparable products, but also, in terms of the possible reduction of the free material cross-sections, allows a more rapid cooling of the plastic material within the molding screen 12. The plastic material in the respective cavity 16 then hardens more quickly, with the result that molding can be done more quickly than in previous process solutions, resulting in faster operation of the molding tool 14 as a whole.

The above mentioned bands 12 and 18 are preferably formed out of metal materials. Other material combinations are also possible. In particular the additional band 18 could also be made out of a plastic material having an especially good sealing action. The band 18 may also have a coating that improves the sealing effect, or may be formed as a multi-layered structure, for example in the form of a well-sealed first layer and stabilizing second layer, which is formed out of a different material than that of the first layer. As FIG. 1 further shows, the finished closure or adhesion product 44 can then be removed from the molding device for later application by a discharge roller 46. A heating and/or cooling device 48 may also be disposed in the region of such a shaping zone, with which the curing process may be optimized.

In order to achieve an especially good sealing effect in the region where the counter-face 20 of the cover band 18 comes into contact with the contact surface 24 of the molding screen 12, at least one of the two surfaces is provided with a roughness Rz of 0.02 to 2.5 µm, preferably in the range of 1.3 µm.

The method according to the invention for producing a closure or adhesion product according to the depiction in FIG. 4 may, in principle, be achieved by a thermoplastic. Polypropylene, polyamide or polyethylene are preferably used, depending on the intended use. Copolymers, or terpolymers, respectively, containing one or more of the thermoplastic resins mentioned are suitable.

If the later use of the end product is intended in particular for adhesion processes with third components, polyvinyl siloxane in particular, or any plastic having a corresponding thixotropic behavior may be used as a plastic material. In the case of these plastic materials, which should have a rotational viscosity, as measured using a rotation viscometer, of between 7,000 to 15,000 mPas, preferably a value of approximately 10,000 mPas, with a shear rate of 10 1/S.

FIG. 3 shows a manufacturing device that is modified as compared to FIG. 1, having a production direction that is essentially vertical. Insofar as the components used in FIG. 3 correspond to the components in FIG. 1, the same reference characters will also be used in FIG. 3. Explanations that have already been provided in this respect shall also apply to the embodiment of the manufacturing device according to FIG. 3.

An essential difference between the two manufacturing devices, however, is that both the band-shaped molding screen 12 and the additional band 18 are now disposed in turn in a closed manner as a molding tool 14 on a cylindrical molding drum 50. In turn, the plastic material is introduced into the cavities 16 of the molding device by the extruder application device 26 in order to form the end product 44. In the present embodiment of the manufacturing device, however, instead of the above-described compression rollers 28, an intrinsically closed pressing and contact band 54 is guided by deflection rollers 52 in the direction of the arrow, in order to ensure the continuous introduction and retention of the plastic material in the respective molding cavity 16. The band 54, which is formed as a single piece, then forms a kind of counter surface opposing the additional band 18 in this regard, and seals the cavities 16 against the environment in the other direction, likewise in a sealing manner. In particular, the band-shaped support part 30 made of a plastic material improves the seal against the outside in the manner of an additional sealant. Furthermore, when viewed in terms of the width, the contact band 54 in turn extends into the plane of the drawing of FIG. 3 across the entire width of the drum-shaped molding tool 14, at least far enough that, insofar as cavities 16 are present, these cavities are also completely covered by the contact band 54.

FIG. 4 shows a manufacturing device that has been modified as compared to those in the previously presented manufacturing devices in that the cavities 16 of the molding screen 12 are disposed directly on the cylindrical guide element 10. The rotational direction of the guide element 10 is indicated by an arrow in FIG. 4. By the extruder or application device 26, in turn, the plastic material is now introduced into the cavities 16 of the molding screen 12 by a blade device 55. The necessary seal between the molding screen 12 and the guide element 10 is then implemented by the outside of the mold 10 and the inside of the molding screen 12 in the region where the plastic is applied by the blade device 55.

In a further embodiment of a manufacturing device not shown here, the screen 12 may also be entirely around the cylindrical guide elements, so that in a concentric structure, the cylindrical molding screen 12 encloses the cylindrical guide elements 10 while maintaining the necessary fit size to form a seal.

Figure 5:
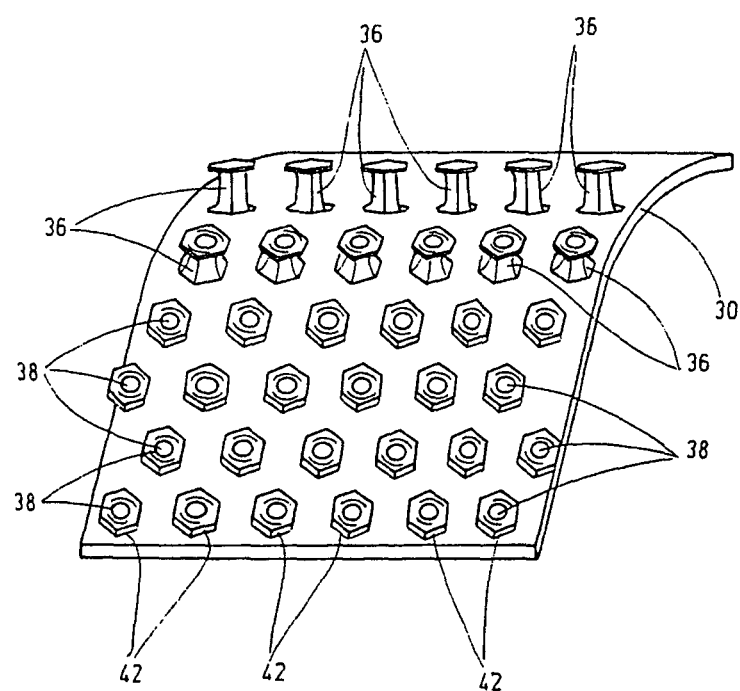
FIG. 5 is a perspective view of a closure or adhesion product manufactured using a device according to FIGS. 1 to 4, as well as the method described below.

FIG. 5 on the other hand, shows the completed end product, which may be produced using the manufacturing devices according to the FIGS. 1 to 4. The end product is characterized in that the height thereof, between the underside of the support 30 and the upper side of the support 30, is low enough, preferably equaling 40 to 120 µm, particularly preferably 70 to 110 µm, that the product has elastic properties at least in partial regions, especially in the longitudinal direction of the support 30.

If a conventional thermoplastic such as polypropylene, polyamide, polyethylene, etc. is used, the flank ends 42 of the respective head part 38 will be formed sufficiently rigid, due to the above described orientation of the plastic material due to the enclosure of air in the respective cavity 16, so that the underside of the respective flank end 42 provides a secure hooking ability for the lower grip of a loop type material for an additional hook and loop component (not shown), in order to form the Kletten® hook and loop fastener. Closure parts, such as those depicted in FIG. 4, may also interact with the same closure parts (not shown) of a further hook and loop fastener in order to likewise form such a fastener that can be repeatedly opened or closed, which fastener then has mushroom-shaped head parts 38 on both sides as hooks.

The stem parts 36 shown in FIG. 5 as well as the head parts 38 are each formed having a polygonal shape, in particular a hexagonal shape. Cylindrical stem parts (not shown), or stem parts having other shapes, may also be achieved depending on the shape geometry of the respective molding screen 12.

If polyvinyl siloxane or another plastic material having the specified thixotropy is preferably used, an adhesive product will be formed from a closure, in which the free end faces of the head parts 38 may adhere to other surfaces, in particular of third components, under the action of the van der Waals forces. The method according to the invention as well as the manufacturing devices thereof thus may be adapted in such a way that on one occasion the described closure product may be obtained, and on another occasion, the specified adhesion product may be obtained.

While various embodiments have been chosen to illustrate the invention, it will be understood by those skilled in the art that various changes and modifications can be made therein without departing from the scope of the invention as defined in the claims.

The invention claimed is:

1. A method for producing a plastic product including a support having stem parts projecting from a side of the support and having head parts being on free ends of the stem parts and being wider than the stem parts, the method comprising the steps of:
    delivering plastic material onto a molding screen and into cavities in the molding screen; and
    forming stem parts and the head parts in the cavities of the molding screen in a shaping zone, while forming the support on the molding screen outside of the cavities on an outer surface of the molding screen, the shaping zone being sealed off from an environment surrounding the molding screen at inner ends of the cavities by a counter-face such that predeterminable quantities of gas are enclosed in the shaping zone between the plastic material in the cavities and the counter-face and such that the gas exerts counter-pressures on the plastic material in the cavities to support shaping of the plastic material into the head parts, sealing of the shaping zone being achieved by surface configurations on the molding screen and on the counter-face, at least one of the surface configurations having a roughness Rz of 0.02 µm to 2.5 µm.

2. A method according to claim 1 wherein
at least one of the two surface configurations has a roughness Rz of 1.3 µm.

3. A method according to claim 1 wherein
the shaping zone formed by the cavities comprises screen parts in the molding screen contracting the counter-face to form the sealing during the shaping of the plastic material in the cavities, the counter-face being a band.

4. A method according to claim 1 wherein
the counter-face and the molding screen are at least one of roller-shaped or band-shaped device components being driven for continuous circulation.

5. A method according to claim 1 wherein
the cavities in the molding screen have hyperboloid of revolution shapes.

6. A method according to claim 1 wherein
the plastic material is at least one of a thermoplastic or plastic with high thixotropic values.

7. A device for producing a plastic product including a support having stem parts projecting from a side of the support and having head parts being on free ends of the stem parts and being wider than the stem parts, the device comprising:
    a plastic material supplier having an outlet;
    a molding screen adjacent said outlet, the molding screen having cavities in a shaping zone configured to form the stem parts and the head parts on the support and to form the support outside of the cavities on an outer surface of the molding screen; and
    a counter-face being on an inner surface of the molding screen sealing inner ends of the cavities from an environment surrounding the molding screen and being capable of enclosing a predetermined quantity of gas in the shaping zone exerting counter-pressures on plastic material in the cavities of the shaping zone to support shaping of the plastic material in the cavities, at least one of facing surfaces of the molding screen or the counter-face having a surface configuration with a roughness Rz of 0.02 to 1 µm.

8. A device according to claim 6 wherein
the roughness Rz is 0.1 µm.

9. A device according to claim 7 wherein
at least one of the two surface configurations has a roughness Rz of 1.3 µm.

10. A device according to claim 7 wherein
the shaping zone formed by the cavities comprises screen parts in the molding screen contracting the counter-face to form the sealing during the shaping of the plastic material in the cavities, the counter-face being a band.

11. A device according to claim 7 wherein
the counter-face and the molding screen are at least one of roller-shaped or band-shaped device components being driven for continuous circulation.

12. A device according to claim 7 wherein
the cavities in the molding screen have hyperboloid of revolution shapes.

13. A device according to claim 7 wherein
the plastic material is at least one of a thermoplastic or plastic with high thixotropic values.

* * * * *